United States Patent [19]

Chiang et al.

[11] Patent Number: 5,079,195

[45] Date of Patent: Jan. 7, 1992

[54] METHOD OF PREPARING REFRACTORY SILICON CARBIDE COMPOSITES AND COATINGS

[75] Inventors: Yet-Ming Chiang, Ashland; Robert P. Messner, Boston, both of Mass.

[73] Assignee: Massachusetts Institute of Technology, Cambridge, Mass.

[21] Appl. No.: 144,931

[22] Filed: Jan. 15, 1988

[51] Int. Cl.$^5$ ...................... C04B 35/52; C04B 35/56
[52] U.S. Cl. ........................................ 501/92; 501/87; 501/88; 423/345; 428/698; 428/704; 428/408
[58] Field of Search .................... 264/29.5, 56, 60, 62; 423/345, 346; 427/228, 229, 397.7, 430.1; 428/408, 689, 698, 704; 501/88, 90, 92, 96, 87, 91

[56] References Cited

U.S. PATENT DOCUMENTS

| | | | |
|---|---|---|---|
| 3,235,346 | 2/1966 | Hucke | 29/190 |
| 3,246,275 | 4/1966 | Schrewelius et al. | 338/330 |
| 3,348,967 | 10/1967 | Hucke | 117/118 |
| 4,477,493 | 10/1984 | Parkinson et al. | 427/228 |
| 4,597,923 | 7/1986 | Kennedy et al. | 423/345 X |
| 4,737,476 | 4/1988 | Hillig | 427/397.7 |
| 4,810,532 | 3/1989 | Lavendel et al. | 427/397.7 |
| 4,891,338 | 1/1990 | Giesing et al. | 501/87 |

FOREIGN PATENT DOCUMENTS 0368517  5/1990  European Pat. Off. .

OTHER PUBLICATIONS

Mehan, "Effect of SiC Content and Orientation on the Properties of Si/SiC Ceramic Composite", Journal of Materials Science 13, 358 (1978).

Hillig et al., "Silicon/Silicon Carbide Composites", Ceramic Bulletin 54, 1054 (1975).

Forrest et al., "The Fabrication and Properties of Self-Bonded Silicon Carbide Bodies", Special Ceramics 5, British Ceramic Research Association, Stoke-on-Trent (1972), pp. 99, 100, 117.

Hucke, "Process Development for Silicon Carbide Based Structural Ceramics", Army Materials and Mechanics Research Center Interim Report for Contract No. DAAG 46-80-C-0056-P0004, Jan. 1983.

Edward E. Hucke, "Process Development for Silicon Carbide Based Structural Ceramics", Report DAAG4-6-80-C-0056-P0004 AMMRC TR-??-?, Army Materials and Mechanics Research Center, p. 57, Jan. 1985.

*Primary Examiner*—Michael Lusignan
*Attorney, Agent, or Firm*—Choate, Hall & Stewart

[57] ABSTRACT

A carbonaceous preform is infiltrated with a silicon melt alloyed with at least one element which is substantially insoluble in silicon carbide and which forms refractory phases. The resulting silicon carbide composite has substantially no free silicon. Silicides of the alloying elements are a suitable refractory phase. Suitable alloying elements which form refractory silicides include Mo, W, Re, Hf, Zr, Cr, B, and Ti. The carbonaceous preform may include graphite particulates, carbon particulates, porous carbon skeletons, carbon-carbon composites, carbon fibers, and graphite fibers. Particulates may be incorporated into the preform for the purpose of improving mechanical properties. Suitable particulates include refractory metals, carbides, nitrides, borides, silicides, and oxides. Fiber-reinforced composites can be produced by incorporating whiskers, chopped fibers, or continuous fibers of a refractory material into the preform. The refractory phase in the composite has a beneficial effect on the high temperature mechanical properties, such as the hardness, strength, toughness, and creep resistance of the silicon carbide composites.

20 Claims, 5 Drawing Sheets 0.36 mm

FIG. 4    0.36 mm

METHOD OF PREPARING REFRACTORY SILICON CARBIDE COMPOSITES AND COATINGS

The government has rights in this invention pursuant to Contract No. N00014-85-K-0645 awarded by the Department of the Navy.

BACKGROUND OF THE INVENTION

This invention relates to a method of preparing refractory silicon carbide composite materials having a minimum of free silicon by the infiltration of carbonaceous preforms with alloyed silicon melts.

The formation of silicon carbide through the infiltration of carbonaceous preforms with liquid silicon is known. This process was first developed in the 1950's by the United Kingdom Atomic Energy Authority (UKAEA) as a means of bonding coarse silicon carbide grains together into a refractory body, hence the name "self-bonded silicon carbide" or "reaction-bonded silicon carbide" (RBSC). The reaction of liquid silicon with solid carbon forms SiC in a rapid and exothermic process.

The General Electric Company has also developed a family of related silicon/silicon carbide materials, known under the tradename SILCOMP*, which are fabricated by infiltrating fibrous carbon materials with liquid silicon, to obtain silicon carbide substantially retaining the fibrous habit of the preform. The fabrication and properties of these materials are described in papers by R.L. Mehan, Journal of Materials Science, 13, 358, 1978, and W.B. Hillin et al., Ceramic Bulletin, 54[12], 1054, 1975. In U.S. Pat. Nos. 3,325,346 and 3,348,967, Hucke described fabrication of hard carbide materials by infiltrating carbon frameworks with liquid metal melts that react with the framework. Thus, carbide materials other than silicon carbide can also be fabricated by melt infiltration and reaction.

For the synthesis of silicon carbide materials, the speed of the process can be one advantage, and results from the very good wetting of carbon by molten silicon, the low viscosity and rapid infiltration of the Si melt, and the self-heating nature of the reaction. As will be discussed below, however, sometimes the reaction rate is too rapid, resulting in dissolution of the carbon skeleton or, in some cases stopping the infiltration process. Another advantage of the RBSC process is that the temperatures required are much lower than usual methods of consolidating SiC for applications at high temperature. Processing is usually done near the melting point of silicon (1410° C.), whereas hot-gressing and sintering of SiC requires at least 1800° C. A third advantage is that reaction-bonding can directly yield a fully-dense material. Finally, it is possible to prepare objects that have a minimum of shape and dimensional changes relative to the starting preform—it is a near-net shape, near-net dimension process.

The work of Hucke improved on the microstructures and strengths attainable in RBSC by controlling the characteristics of the carbon preform. See, "Process Development for Silicon Carbide Based Structural Ceramics," Army Materials and Mechanics Research Center Report No.. DAAG46-80-C-0056-P004, Jan. 1983. By pyrolysis of an orqanic precursor, a microporous and uniform carbon preform can be obtained. Upon liquid Si infiltration of these preforms, a finer-drained microstructure of SiC with correspondingly higher strength (up to 714 MPa) was achieved than in the case of coarser drained particulate carbon starting materials.

However, there has always been one serious deficiency to the reaction-bonded silicon carbide process which has prevented use of these materials at high temperatures (>1410° C.). i.e., above the melting point of silicon. In order to obtain full infiltration to useful dimensions, it has been necessary to use preforms with an excess of porosity, such that free silicon remains after full reaction. The high density of RBSC is therefore achieved by filling excess void space with free silicon. It is not sufficient to leave an excess of carbon in the preform, for often the reaction does not do to completion, leaving unreacted carbon particulates which can degrade the mechanical properties due to differential thermal expansion between carbon and SiC. These difficulties are well-documented in the Hucke work cited above, in the general literature, and in a recent U.S. Pat. No. 4,477,493. These limitations hold true even when fine, microporous carbons are used. The amount of free silicon is usually 5–15%, and causes the high temperature strength and creep resistance of RBSC to degrade rapidly above 1410° C. Thus, while the processing temperatures of RBSC are low relative to alternative processes such as hot-pressing and sintering, the ultimate use temperatures are not any higher than processing temperatures.

SUMMARY OF THE INVENTION

The method for making refractory silicon carbide composite materials according to the invention includes infiltrating a carbonaceous preform with a silicon melt alloyed with at least one element which is substantially insoluble in silicon carbide and which forms refractory phases. Upon infiltration of the carbonaceous preform with this alloy, the silicon component of the melt reacts with carbon to form SiC in the usual was, whereas the alloying element or elements are rejected into the remaining melt. As reaction proceeds, the residual silicon melt becomes sufficiently enriched in the alloying element(s) to begin to form refractory phases. When the preform carbon content, pore volume, and alloying elements concentration are properly controlled, the refractory phases occupy all of the excess pore volume after reaction is complete, and a dense composite material including SiC and one or more refractory phases is obtained. There is a minimum of free silicon remaining.

That is, an excess of porosity relative to that theoretically necessary to form 100% SiC is used in the preform. The melt concentration is chosen such that the residual phases form in the volume fraction necessary to fill the excess porosity. Then, the temperature of the melt is held sufficiently high that it is within the single-phase liquid field at that composition, before infiltrating the preform. Thus, the material obtained is refractory to much higher temperatures than its processing temperatures, and is more refractory than previous liquid silicon reaction-bonded silicon carbide materials. The maximum use temperature of the composite is limited only by the temperatures of melting or decomposition for the refractory phases or SiC. Therefore, it is clear that composite materials prepared according to the method of the invention are usable at temperatures higher than the temperature at which the preform is infiltrated during processing. Of particular interest as the refractory phases are silicides of the alloying elements.

Examples of suitable alloying elements which form refractory silicides include, but are not limited to, Mo, W, Re, Hf, Zr, Cr, B, and Ti. The corresponding silicides include, but are not limited to, $MoSi_2$, $WSi_2$, $W_5Si_3$, $ReSi_2$, $Hf_2Si$, $Hf_3Si_2$, $Hf_5Si_4$, $HfSi$, $HfSi_2$, $Si_2Zr$, $SiZr$, $Si_4Zr_5$, $Si_2Zr_3$, $Si_3Zr_5$, $SiZr_2$, $SiZr_3$, $Cr_3Si$, $Cr_5Si_3$, $SiB_3$, $SiB_6$. These allowing elements can be used single, or in combination (co-doping). The advantages of using multiple additives include 1) improved mechanical properties due to a plurality of silicides or other refractory phases formed, or the obtainment of mixed refractory phases not available in the binary systems; and 2) lowered infiltration temperatures in the case of those additives which lower the melting point of the melt relative to pure silicon. As an example of the first advantage, there are numerous refractory borides of high strength and hardness which can be useful when combined with silicon carbide in composite form. By alloying the silicon melt with silicide forming additives and boron, it is possible to form silicon carbide composites containing both refractory silicides and borides (including $SiB_6$, which may be considered either a boride or a silicide). As an example of the second advantage, the use of two additives each of which lowers the melting point of the liquid relative to pure silicon (i.e., each forms a binary eutectic system) can be used together to lower the melting point farther than can be achieved for either additive alone (i.e., a ternary eutectic is formed). A lowered infiltration temperature can be of advantage for processing economics, for lowered reactivity with other reinforcement phases in the preform, and because it does in general lower the reaction rate between Si and C, thereby allowing more uniform reaction, further infiltration before the reaction products can possibly "choke" off infiltration, and decreased thermal stresses in the body upon reaction (which can cause cracking of the material).

Another advantage of this process and the composite materials prepared is that the refractory phases which are produced are very finely dispersed, and as such can improve the mechanical properties of the material. Certain silicides are particularly useful for improving high temperature toughness and strength because they are more ductile than the matrix SiC. One such silicide is $MoSi_2$, which is brittle below $\sim 1000°$ C. but ductile above. The presence of this finely dispersed ductile phase at high temperatures can act to toughen otherwise brittle SiC by blunting cracks. The decrease in the flaw sensitivity of the material will tend to strengthen it as well. This can be achieved without suffering some of the disadvantages associated with use of $MoSi_2$ alone as a refractory, e.g. its low oxidation resistance at temperatures of $300°-600°$ C., its overly high creep rates under stress at high temperatures ($>1200°$ C.), and its high specific density compared to silicon carbide.

The methods of this invention are applicable also to other refractory carbides, silicides, and borides fabricated by the liquid phase infiltration of carbon, silicon, and boron preforms, respectively, with an alloyed metalloid or metal melt. In each instance, by choosing the alloying element or elements to be those which react with the primary component of the melt to form refractory phases, auxiliary refractory phases are obtained after the primary melt component reacts with the preform to form a carbide, silicide, or boride, thereby substantially segregating the alloying elements into the remaining melt, enriching its concentration of the alloying elements until refractory phases are formed.

DESCRIPTION OF THE PREFERRED EMBODIMENTS

Figure 1:
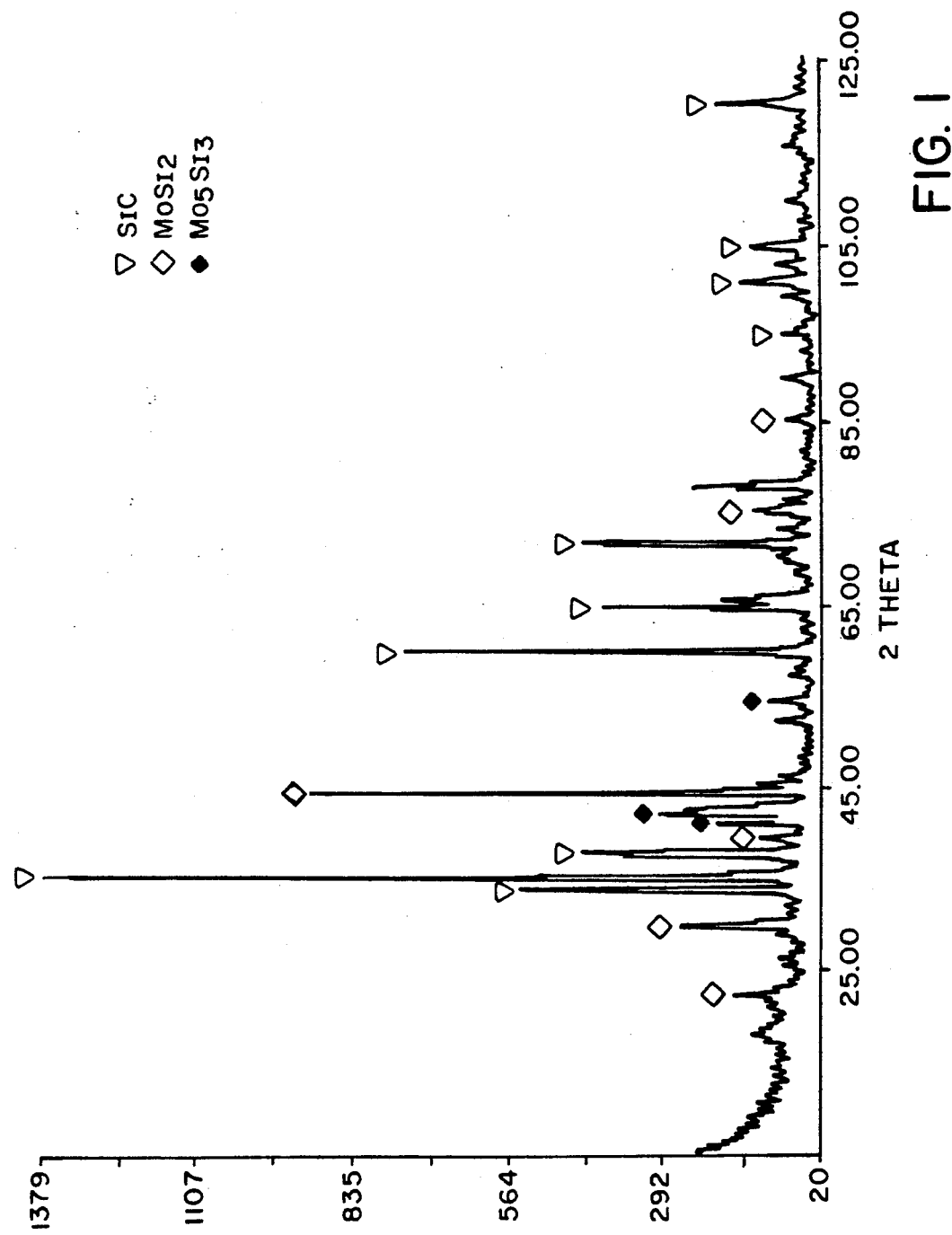
FIG. 1 is an X-ray diffractogram of the infiltrated portion of a composite greater than 0.5 inch thick processed according to the invention.

The process of the invention is a general one for the preparation of dense and highly refractory silicon carbide bodies. It has applications both in the formation of monolithic silicon carbide components consisting of SiC and the refractory phases, and in the formation of multiphase composites in which another component or components are added to the preform prior to infiltration. These other components can be particulates, platelets, short fibers and whiskers, or continuous fiber networks such as fiber bundles, braids, and weaves. The effects of these components are to further strengthen and toughen the composite.

Monolithic components of near-net shape and dimension can be produced by making a preform in desired shapes by a variety of possible forming operations including pressing, casting, injection-molding, extruding, etc., and then infiltrating it with the alloyed silicon melt to obtain the dense refractory composite body. The carbonaceous precursor can be in many forms, including graphite particulates, carbon particulates, organic precursors which are pyrolyzed to yield porous carbon skeletons, carbon-carbon composites, and preforms based on carbon or graphite fibers. Combinations of the above can also be used to form the carbonaceous preform.

The volume fraction of silicon carbide relative to that of the auxiliary refractory phases is widely variable within the methods of the invention. The unreacted carbon content necessary in the preform is determined by the relative amounts of SiC and refractory phases desired. Calculation of the required preform carbon content is simple and requires consideration of the densities (by weight or by mole) and specific volumes of carbon in the form used. SiC, and the refractory phases which result. The Examples included herein are illustrative of results from such calculations. There can be processing advantages to either high or low carbon contents (resulting in low and high refractory phase fractions relative to SiC, respectively). At low carbon contents, the correspondingly high porosity allows more rapid and extensive infiltration of the preform. However, this requires that the alloying element(s) content of the melt also be high, so that the greater excess porosity is filled with the refractory phases after reaction is complete, and in general will require a higher infiltration temperature in order to maintain a homogeneous liquid phase. At high carbon contents, infiltration is slower and the ultimate depth which can be infiltrated may be less, but the required concentration of alloying element(s) is less, and lower infiltration temperatures are in general possible.

The volume fraction of reinforcing phases which do not participate in the reaction is widely variable, and can range from 0% to nearly 100% by volume. Whatever its volume fraction, the remainder is what must be considered for calculation of the necessary carbon content and alloy concentrations, and determination of the processing temperature.

Particulates that can be incorporated into the preform for the purpose of improving mechanical properties or the ease of processing include refractory metals, carbides, nitrides, borides, silicides, and oxides. Examples include SiC particles and whiskers, which can fill space as well as act as seeds for deposition of the reaction-produced silicon carbide, silicides similar to those produced as the residual phases, $ZrO_2$ and $ThO_2$ particles (which can toughen the composite via the martensitic transformation toughening mechanism at lower temperatures than those at which the silicide phase becomes ductile), other oxides (MgO, $Al_2O_3$, etc.), nitrides ($Si_3N_4$, AlN, TiN, BN, etc.), borides ($TiB_2$, $ZrB_2$, etc.), oxynitrides (SiAlON, AlON), and refractory metals such as molybdenum and tungsten.

Fiber-reinforced composites can be produced by incorporating whiskers, chopped fibers, or continuous fibers of a refractory material into the preform, leaving the necessary amount of carbonaceous precursor between the fibers to form a dense matrix free of residual silicon upon infiltration of the fiber-plus-precursor composite preform as a whole. The precursor to the matrix in this case can be any of the above carbonaceous precursors and can be combined with any of the particulate reinforcements.

There are significant processing and properties advantages to this method of fabricating a fiber-reinforced composite, compared with other techniques such as hot-pressing, pressureless sintering, isostatic hot-pressing, reaction-bonding from the gaseous phase, or chemical vapor infiltration. Processing advantages include the ability to fabricate more complex shapes of a wide range of sizes, at reduced processing times and temperatures. Post-processing machining and joining can be minimized.

The properties improvements are twofold. First, the attainment of greater matrix density than competing processes will improve strength, all other factors being equal. Secondly, the use of a matrix material which is toughened has great potential for improving the strength, toughness, and environmental stability of fiber-reinforced refractory composites. Often, degradation of a fiber-reinforced composite occurs if the matrix is cracked such that hostile environments can attack the fibers. This is much less likely to occur in a composite with a tough and uncracked matrix. Since the toughening of some of the present materials can be achieved at high temperatures, rather than low temperatures as with the transformation-toughened zirconia based ceramics for example, this novel process and material represents an entirely new class of high-temperature-toughened refractory ceramics and ceramic composites.

Yet another application of the present process is in the formation of refractory composite coatings on carbonaceous bodies. This coating has the same intrinsic properties as do the dense bodies described above. It thus serves to strengthen and protect the remaining carbon interior. One particularly useful application is as coatings for carbon-carbon composites. These are materials consisting of carbon or graphite fiber weaves infiltrated with a carbonaceous matrix material. They have unusually high specific strengths and specific moduli, and are considered for many aerospace applications. However, their oxidation resistance at high temperatures is very poor, since carbon oxidizes to gaseous CO and $CO_2$. By partially infiltrating these carbon-carbon composites such that the surface reacts with the melt to form a SiC-refractory phase composite, a protective barrier which is strong and much more oxidation resistant than the underlying material is formed. These coatings are an improvement over coatings formed by partial infiltration of a carbonaceous preform with liquid silicon alone, for the same reasons of high temperature strength and toughness as the bulk materials. Similar coatings can be applied to carbon bodies that do not contain fibers, with substantially the same improvements.

Yet another application of the present process is in the joining of carbonaceous bodies with a refractory composite material. The joining medium has the same intrinsic properties as do the dense bodies and coatings described above, and provides a strong and refractory join between two refractory bodies. As an example, carbon containing components can be formed to shape and placed adjacent to one another in their final positions, and then the join between them can be infiltrated with an alloyed melt similar to those used above to form dense bodies or coatings. After infiltration and reaction, the components become bonded with the refractory silicon carbide composite material.

EXAMPLE I

A preform consisting of a fine (<10 micron) graphite powder mixed in a 1:1 volume ratio with a fine (<10 micron) silicon carbide powder is pressed into a desired shape, such that the void volume of the preform is 40g and the free-carbon density 0.56 $gm/cm^3$. This preform is infiltrated with a 92 mole g Si, 8 mole to Mo melt, at a temperature of 1625°–1650° C. (the melt lies in the single-phase liquid field of the Si-mo binary phase diagram), in either vacuum or an inert atmosphere such as Ar or He. After holding for a short time (less than one hour) a fully infiltrated composite of greater than 0.5 inch thickness consisting of predominantly the phases SiC and molybdenum silicides is achieved. The X-ray diffractogram of the infiltrated portion is shown in FIG. 1. The predominant crystalline phases are SiC and molybdenum silicides. In particular, the positions of the strongest silicon line, if silicon were present, is marked, and it is seen that there is no detectable free silicon. Similarly, there is no detectable free carbon. More detailed microstructural investigations of the material are now described. A polished section of this material, the microstructure of which is shown in the secondary electron image in FIG. 2. has been analyzed using energy-dispersive X-ray microanalysis and electron microprobe microanalysis. The image in FIG. 2, as well as all other infiltrated regions, show a bright phase which is molybdenum silicide and a dark phase which is silicon carbide. In no place does there appear a Si signal without a corresponding Mo or C signal to show that the phase is a molybdenum-silicide or silicon-carbide phase. Thus, there are no regions which are free silicon alone. It is also seen in the microstructure in FIG. 2 that the silicon carbide initially present in the material remains, and additional silicon carbide has formed around it to the extent that the two are not clearly distinguishable.

This thus illustrates that reinforcement particles and fibers can be incorporated into the preform to produce a reinforced composite that is also fully dense.

EXAMPLE II

Figure 2:
FIG. 2 is a secondary electron image of a polished section of the composite of FIG. 1.

A carbon preform consisting of fine particulates (<10 microns) varying in density from 0.50 to 0.95 g/cm$^3$ is infiltrated with a Si-Mo melt to obtain a SiC - molybdenum silicide composite with minimal free silicon and free carbon, like that shown in FIG. 2. The specific Mo concentration depends on the carbon preform density, and varies from 20% to 1% by mole. The concentration of Mo necessary for different carbon preform densities, the volume fraction of SiC which results (the remainder being primarily MoSi$_2$ with some Mo$_5$Si$_3$), and a useful infiltration temperature range (equal to or above that necessary to maintain a homogeneous liquid), are shown in Table I.

TABLE I

| Carbon Density (g/cm$^3$) | Mo Concentration (mole %) | SiC Content (vol. %) | Melt Temp. (°C.) |
|---|---|---|---|
| 0.50 | 19.6 | 52 | 1900-2000 |
| 0.60 | 16.1 | 62.5 | 1800-1900 |
| 0.70 | 12.2 | 73 | 1700-1900 |
| 0.80 | 7.9 | 83.3 | 1550-1800 |
| 0.86 | 5.1 | 89.5 | 1500-1800 |
| 0.88 | 4.2 | 91.6 | 1450-1800 |
| 0.90 | 3.2 | 93.7 | 1420-1800 |
| 0.93 | 1.6 | 96.8 | 1420-1800 |

EXAMPLE III

A silicon carbide composite free of residual silicon in which the auxiliary phase is primarily B$_6$Si is made by infiltrating carbon preforms as described in Example II with a Si-B melt. The melt composition ranges from 3% to 65% by mole, depending on the preform carbon density. Table II gives the boron concentration necessary, the volume fraction of SiC which results, and the infiltration temperature range for various carbon densities. Preforms containing both carbon and a second refractory phase, such as described in Example I, also can be infiltrated to obtain composites like those shown in Example I but in which the auxiliary phase is primarily B$_6$Si, by altering the B concentration of the melt to suit the free volume of the preform and the carbon density.

TABLE II

| Carbon Density (g/cm$^3$) | B Concentration (mole %) | SiC Content (vol. %) | Melt Temp. (°C.) |
|---|---|---|---|
| 0.50 | 58.5 | 52 | 1800-1850 |
| 0.55 | 54.4 | 57 | 1750-1850 |
| 0.60 | 50 | 62 | 1700-1850 |
| 0.65 | 45.2 | 68 | 1700-1850 |
| 0.70 | 40 | 73 | 1650-1850 |
| 0.75 | 34 | 78 | 1650-1850 |
| 0.80 | 27.4 | 83 | 1550-1850 |
| 0.85 | 21.1 | 88 | 1480-1850 |
| 0.90 | 11.9 | 94 | 1420-1850 |
| 0.93 | 7 | 96 | 1410-1850 |
| 0.94 | 5 | 98 | 1410-1850 |

EXAMPLE IV

Figure 3:
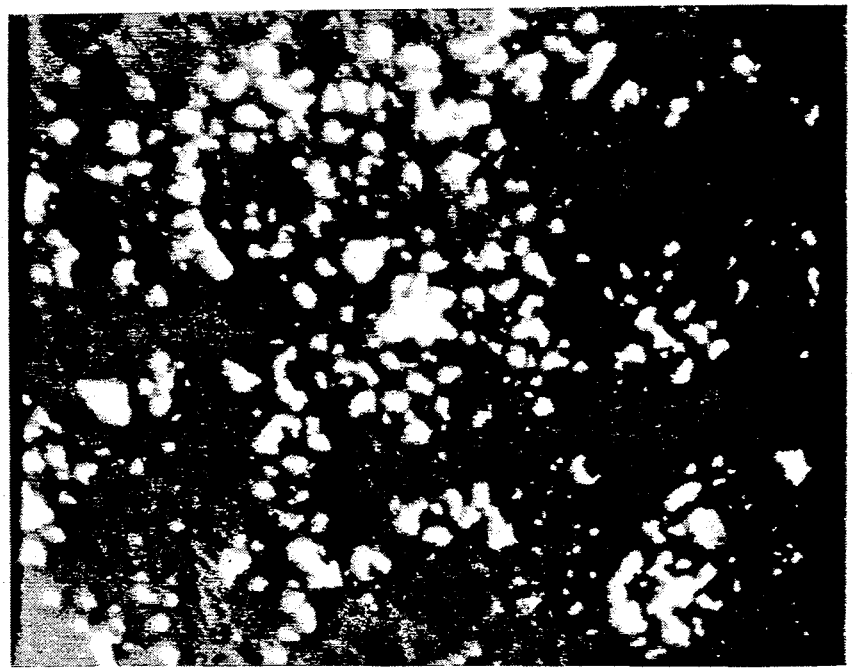
FIG. 3 is a secondary electron image of a composite processed according to the invention containing molybdenum silicides and borides as auxiliary phases.

A carbon preform as described in Examples I-III is infiltrated with a Si-Mo-B melt to fabricate a silicon carbide composite in which the auxiliary phases are molybdenum boride alone, molybdenum silicide and molybdenum boride, molybdenum boride and boron silicide, or a combination of all three materials. The microstructure of a composite prepared accordingly is shown in the image in FIG. 3, where the bright phase is found using electron microprobe to be molybdenum borides of two different Mo/B ratios.

EXAMPLE V

A carbon preform as described in Examples I-III is infiltrated with a Si-Ti-B melt to fabricate a silicon carbide composite in which the auxiliary phases is titantiumboride.

EXAMPLE VI

Surface Coating For Carbon Composites

Figure 4:
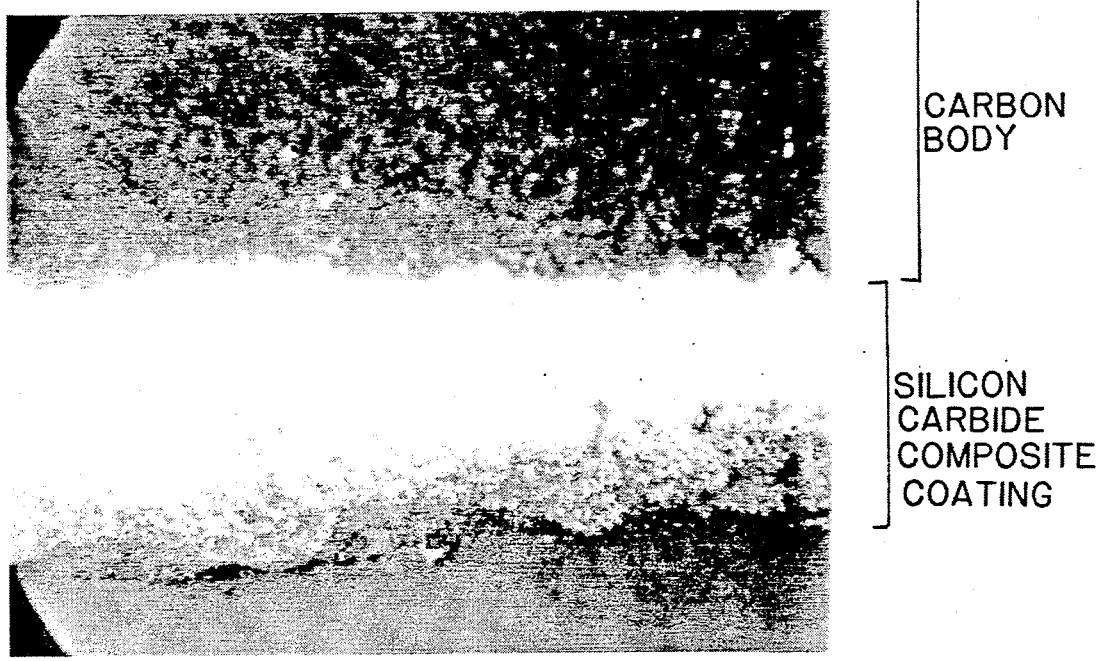
FIG. 4 is a photomicrograph of a thin surface coating prepared according to the invention.
Figure 5:
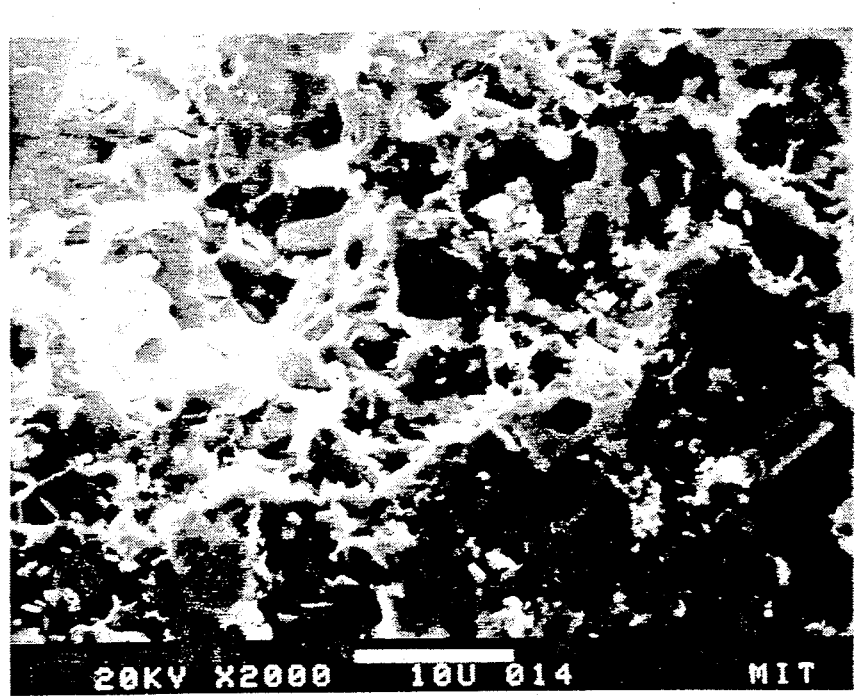
FIG. 5 is a scanning electron photomicrograph of the coating of FIG. 4, which contains only silicon carbide and molybdenum silicide.

A homogeneous melt consisting of 88 mole % Si and 12 mole % mo was formed. This melt was used to partially infiltrate a graphite-silicon carbide preform with the same characteristics as in Example I. Infiltration was carried out in vacuum, or alternatively, inert atmosphere such as Ar or He, at 1625° C., a temperature at which the melt is approximately saturated with Mo. Because the melt is saturated, MoSi$_2$ is formed immediately as the melt infiltrates, and forms in such quantity that it prevents melt infiltration to excessive depths. The result is a thin surface coating, as shown in FIG. 4. Scanning electron microscopy analysis shows this surface coating to consist of only SiC and molybdenum silicide, as shown in the microstructure in FIG. 5, with no free silicon in the coating except at the very outer surface where the coating was in contact with the melt. By varying the preform porosity and the temperature and composition of the melt, the depth of infiltration and hence the thickness of the surface coating can be varied from less than one millimeter to greater than ten millimeters. By using a Si-B melt which is saturated with b, a surface coating of SiC and refractory phase consisting primarily of B$_6$Si is formed.

What is claimed is:

1. Method for making refractory composite materials usable at a first temperature comprising infiltrating at a second temperature lower than said first temperature a carbon, boron, or silicon preform structure with an alloyed metalloid or metal melt containing at least one element which is substantially insoluble in the primary carbide, boride, or silicide which is formed and which forms an auxiliary refractory phase when segregated to the remaining melt.

2. Method for making silicon carbide/silicide composite materials comprising infiltrating a carbonaceous preform with a silicon melt alloyed with at least one element which is substantially insoluble in silicon carbide and which forms refractory silicides.

3. The method of claim 1 or 2 wherein the at least one element is selected from the group consisting of Mo, W, Re, Hf, Zr, Cr, B, and Ti.

4. The method of claim 2 wherein the carbonaceous preform comprises graphite particulates.

5. The method of claim 2 wherein the carbonaceous preform comprises carbon particulates.

6. The method of claim 2 wherein the carbonaceous preform has a porous carbon skeleton.

7. The method of claim 2 wherein the carbonaceous preform is a carbon-carbon composite.

8. The method claim 2 wherein the carbonaceous preform comprises carbon fibers.

9. The method of claim 2 wherein the carbonaceous preform comprises graphite fibers.

10. The method of claim 1 or 2 wherein the preform includes refractory metal particulates.

11. The method of claim 1 or 2 wherein the preform includes refractory carbide particulates.

12. The method of claim 1 or 2 wherein the preform includes refractory nitride particles.

13. The method of claim 1 or 2 wherein the preform includes refractory boride particles.

14. The method of claim 1 or 2 wherein the preform includes refractory oxide particles.

15. The method of claim 1 or 2 wherein the preform includes refractory oxynitride particles.

16. The method of claim 1 or 2 wherein the preform includes refractory silicide particles.

17. The method of claim 1 or 2 wherein the preform includes refractory particles selected from the group consisting of $MoSi_2$, $B_6Si$, $SiC$, $Si_3N_4$, $TiB_2$, $ZrO_2$, $ThO_2$, $MgO$, $Al_2O_3$, $AlN$, $TiN$, $BN$, $SiAlON$, and $AlON$.

18. The method of claim 1 or 2 wherein the preform includes refractory whiskers.

19. The method of claim 1 or 2 wherein he preform includes chopped fibers.

20. The method of claim 1 or 2 wherein the preform includes continuous fibers.

* * * * *

UNITED STATES PATENT AND TRADEMARK OFFICE
CERTIFICATE OF CORRECTION

PATENT NO. : 5,079,195

DATED : January 7, 1992

INVENTOR(S) : Yet-Ming Chiang and Robert P. Messner

It is certified that error appears in the above-identified patent and that said Letters Patent is hereby corrected as shown below:

Column 1, line 32: delete "Hillin" and insert therefor -- Hillig --;
          line 52: delete "hot-gressing" and insert therefor -- hot-pressing --;
          line 67: delete "finer-drained" and insert therefor -- finer-grained --;

Column 2, line 2: delete "drained" and insert therefor -- grained --;
          line 13: delete "do" and insert therefor -- go --;
          line 37: delete "was" and insert therefor -- way --;

Column 3, line 5: delete "allowing" and insert therefor -- alloying --;
          line 5: delete "single" and insert therefor -- singly --;

Column 6, line 37: delete "40g" and insert therefor -- 40% --;
          line 39: delete "g" and insert therefor -- %;
          line 39: delete "to" and insert therefor -- % --;
          line 41: delete "Si-mo" and insert therefor -- Si-Mo --;

Column 8, line 16: delete "mo" and insert therefor -- Mo --;
          line 37: delete "b" and insert therefor -- B --; and

UNITED STATES PATENT AND TRADEMARK OFFICE
CERTIFICATE OF CORRECTION

PATENT NO. : 5,079,195

DATED : January 7, 1992

INVENTOR(S) : Yet-Ming Chiang and Robert P. Messner

It is certified that error appears in the above-identified patent and that said Letters Patent is hereby corrected as shown below:

Column 10, line 10: delete "he" and insert therefor --the--.

Signed and Sealed this

Sixth Day of July, 1993

Attest:

MICHAEL K. KIRK

Attesting Officer

Acting Commissioner of Patents and Trademarks